United States Patent [19]
Frankenfeld et al.

[11] 3,806,615
[45] Apr. 23, 1974

[54] ALIPHATIC DIOLS AND THEIR ESTERS AS ANTIMICROBIAL ADDITIVES FOR CHEESE AND MEATS

[75] Inventors: John W. Frankenfeld, Atlantic Highlands, N.J.; Marcus Karel, Newtonville; Theodore P. Labuza, North Tewksbury; Anthony J. Sinskey, Southbridge, all of Mass.

[73] Assignee: Esso Research and Engineering Company, Linden, N.J.

[22] Filed: Oct. 16, 1972

[21] Appl. No.: 297,831

Related U.S. Application Data

[63] Continuation of Ser. No. 42,867, June 2, 1970, abandoned.

[52] U.S. Cl.............. 426/328, 426/332, 426/334
[51] Int. Cl. .................. A23b 1/14, A23c 19/00
[58] Field of Search.......... 99/150 R, 151, 157, 158, 99/161–164, 90 P, 91, 92, 162, 115–117; 424/343

[56] References Cited
UNITED STATES PATENTS

| | | | |
|---|---|---|---|
| 3,145,108 | 8/1964 | Howard | 99/92 X |
| 3,202,514 | 8/1965 | Burgess et al. | 99/2 |
| 3,248,227 | 4/1966 | Martin | 99/92 |
| 3,373,044 | 3/1968 | Thompson et al. | 99/92 |
| 3,667,964 | 6/1972 | Frankenfeld et al. | 99/150 R X |
| 3,667,965 | 6/1972 | Frankenfeld et al. | 99/150 R X |

*Primary Examiner*—Norman Yudkoff
*Assistant Examiner*—Kenneth P. Van Wyck
*Attorney, Agent, or Firm*—Joseph J. Dvorak

[57] ABSTRACT

Diary products and meats are inhibited against bacteria, particularly salmonellae, and other microorganisms by the addition of certain polyalcohols and their esters, such as 1,3-diols and the mono- or diesters of such diols. The meats include fish, chicken, beef, eggs, etc. and the dairy products include butter, milk, etc.

11 Claims, No Drawings

ALIPHATIC DIOLS AND THEIR ESTERS AS ANTIMICROBIAL ADDITIVES FOR CHEESE AND MEATS

This is a continuation, of application Ser. No. 42,867 filed June 2, 1970 now abandoned.

The present invention is concerned generally with the use of particular diols and their esters as additives for dairy products and meats in order to protect the same against bacteria, particularly salmonellae and molds.

It is known that Salmonella contamination of meats and dairy products have the potentiality for producing infection and disease in humans. *Salmonella* is the genus name of a group of gram negative, nonspore-forming bacteria whose natural habitat is the intestinal tract of man and other animals.

In addition many members of the genus *Staphylococcus* present serious public health problems. Staphylococcal food poisoning is the most common form of true food poisoning occurring in the United States today. The staphylococci are widespread in nature and selected strains may produce enterotoxins involved in characteristic food poisoning incidents.

It has now been discovered that, if particular aliphatic diols and their esters are used as additives in dairy products and meats, these products will be protected against various public health implicated bacteria, including *Salmonella, Staphylococcus, Pseudomonas* and *E. coli*. In addition, these compounds are excellent mold inhibitors. These aliphatic diols, such as aliphatic 1,3-diols of three carbon atoms or more are nontoxic, energy-dense compounds which are very excellent when utilized for the production of a high quality dairy product and meats. These compounds have advantages over current additives not only because of increased effectiveness, but also because they are safer to use.

These additive materials are synthesized easily, they have very desirable properties, and are readily metabolized. These materials have several advantages over usual energy sources in that they are higher in caloric density than carbohydrates and proteins and are more stable than fats and thus may be used as replacements for natural foods. The diols are colorless, virtually odorless and tasteless and are easily formulated into various meat and dairy products. Since they are produced by chemical means from readily obtainable starting materials, they have advantages in that they are available at stable prices and in consistent quantities. They also may be produced readily in localities where arable land for grazing or cultivation is scarce.

These linear polyols contain from about three to 15 carbon atoms in the molecule, preferably about three to about 10 carbon atoms in the molecule. The polyols of the present invention contain hydroxy groups on at least the first and third carbon atoms of the molecule. It is this 1,3-dihydroxy configuration which renders these compounds very useful as meat and dairy product additives because of their inherent safety. Polyalcohols with hydroxyl groups in other positions on the carbon chain are toxic and, therefore, are not useful additives. In addition to being nontoxic and readily metabolized, the 1,3-diols claimed herein have certain other advantages making them highly desirable as meat and dairy food additives: (1) they are stable, nonvolatile oils and have a long storage and shelf life; (2) they have an appreciable water solubility and are readily emulsified, making them easy to formulate in meat and dairy preparations; (3) they are readily absorbed in the intestinal tract and they are completely metabolized.

A summary of the compounds specifically claimed in this invention, along with their caloric densities and some of their physical properties, is presented in Tables I and II. This invention is not limited to these specific compounds. Any 1,3-diol containing more than 3 carbons or its mono- or diester may prove useful for one or more applications as meat or dairy preservatives.

TABLE I

| Diol | BP/mm (°C.) | Taste Odor, etc. | Theoretical Caloric Density K cal./gm[1] |
|---|---|---|---|
| 1,3-butanediol | 202–203 | Colorless, sweet odor, bitter taste | 6.7 |
| 1,3-pentanediol | 78–81/0.5 | Colorless, sweet odor, bitter taste | 7.4 |
| 1,3-hexanediol | 81–82/0.2 | Colorless, slight musty odor, bitter taste | 7.8 |
| 1,3-heptanediol | 90/0.5 | Colorless slight musty odor, slight bitter taste | 8.2 |
| 1,3-octanediol | 87–89/0.3 | Colorless, slight musty odor, slight bitter taste | 8.5 |
| 1,3-nonanediol | 126/1.1 | Colorless, slight musty odor, slight bitter taste | 8.7 |
| 1,3-decanediol | mp[2]=30–31 | Colorless, slight musty odor, slight bitter taste | 8.9 |
| 1,3-undecanediol | mp[2]=41–42 | Coloress, slight musty odor, slight bitter taste | 9.1 |

[1]Caloric density is the theoretically available energy in kilocalories per gram of the compound.
[2]mp = melting point.

It is apparent from the data in Table I that the 1,3-diols are energy dense compounds with desirable physical properties. While these materials may be prepared by any satisfactory method, the following methods are very satisfactory for their preparation.

The Reformatsky reaction followed by reduction:

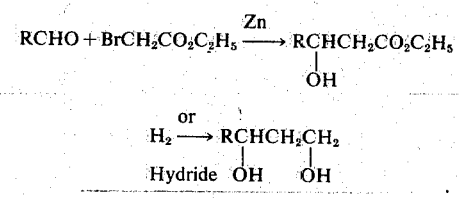

or by means of the Prins reaction of formaldehyde and the appropriate α olefin or mixtures of α olefins:

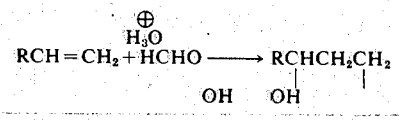

The esters of aliphatic 1,3-diols are synthesized easily, and are readily metabolized. These materials have several advantages over usual energy sources in that they are higher in caloric density than carbohydrates and proteins and are more stable than fats and thus may be used as replacements for natural foods. These materials are also colorless, odorless and tasteless, and are easily formulated into food products. In addition, they possess a unique ability to preserve foods against microbial contamination. Since they are produced by chemical means from readily obtainable starting materials, the esters of 1,3-diols have marked advantages in that they are available at stable prices and in consistent quantities.

The esters are made from diols by reacting them with fatty acids or fatty acid derivatives which contain from about two to 20 carbon atoms in the molecule, preferably 3 to 18 carbon atoms, such as about eight carbon atoms in the molecule. In general, the esters have the following configuration:

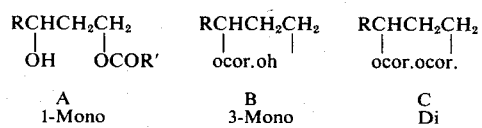

where R represents a straight chain alkyl group containing from zero to 12 carbons and R' represents the alkyl portion of an aliphatic carboxylic acid, saturated or unsaturated, containing two to 20 carbon atoms. The compounds may be varied in molecular weight as long as the 1,3-configuration is preserved. These esters are conveniently prepared either from the diols by reaction with the appropriate acid, acid anhydride or acid chloride:

or, in the case of the diester, C, by means of the Prins reaction of formaldehyde and an α-olefin in the presence of the desired acid:

(4) 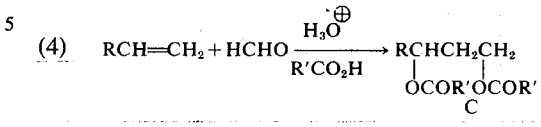

The best materials are those with five to eight carbon hydrocarbon "tail" in either the diol or ester portion of the compound combined with a concentration of polar groups in another part of the molecule, as, for example, 1,3-octanediol-1-monopropionate or 1,3-butanediol-1-monooctanoate. Some especially valuable esters are shown in the following Table II.

TABLE II

PROPERTIES OF SOME 1,3-DIOL ESTERS

| Compound | BP °C. (mm) | Rat Feeding Results Caloric Density (Kcal/g) | | |
|---|---|---|---|---|
| | | Observed | Calculated | % Utilized |
| 1,3-Butanediol (parent diol) | | | | |
| 1-monopropionate | | | | |
| 1-monooctanoate | 90–95 (0.3) | | | |
| 1-monopalmitate | MP* = 29–31 | | | |
| dipropionate | 67–70 (0.4) | | | |
| 1,3-Hexanediol | — | | | |
| 1-monoacetate | 59–62 (0.15) | 6.7 | 7.0 | 95 |
| 1-monooctanoate | 117–122 (0.3) | 8.4 | 9.0 | 95 |
| 1-monopalmitate | 124–126 (0.2) | 7.3 | 9.3 | 78 |
| diacetate | 81–82 (0.9) | | | |
| 1,3-Heptanediol | | | | |
| 1-monooctanoate | 85–90 (1.0) | | | |
| 1-monopalmitate | MP* = 38–39 | | | |
| dipropionate | 90–92 (0.4) | | | |
| 1,3-Octanediol | | | | |
| 1-monopropionate | 83–86 (0.3) | | | |

*MP = melting point.

TABLE III

NUTRITIONAL AND TOXICITY DATA FOR VARIOUS DIOLS

| Compounds | Polyols | Oral LD₅₀ (7 Days)[1,2] | Observed Metabolic Energy (Kcal/g) | % Utilized[3] |
|---|---|---|---|---|
| 1 | 1,3-butanediol | 29 g/kg | 6.0 | 88 |
| 2 | 1,3-pentanediol | >20 g/kg | 7.8 | 100 |
| 3 | 1,5-pentanediol | 2 g/kg | NU[4] | — |
| 4 | 1,3-hexanediol | >20 g/kg | 6.6 | 85 |
| 5 | 1,5-hexanediol | >20 g/kg | NU[4] | — |
| 6 | 2,5-hexanediol | 2 g/kg | NU[4] | — |
| 7 | 1,6-hexanediol | 5 g/kg | NU[4] | — |
| 8 | 1,3-heptanediol | >20 g/kg | 8.0 | 98 |
| 9 | 1,3-octanediol | >20 g/kg | 5.8 | 71 |
| 10 | 1,3-nonanediol | >20 g/kg | 7.5 | 85 |
| 11 | 1,3-decanediol | >20 g/kg | | |
| 12 | 1,3-undecanediol | >20 g/kg | | |

[1]Single dose in rats.
[2]LD₅₀ = lethal dose for 50% kill.
[3]Determined by dividing observed calories by theoretical calories.
[4]N.U. = not utilized.

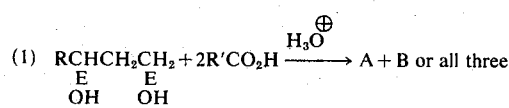

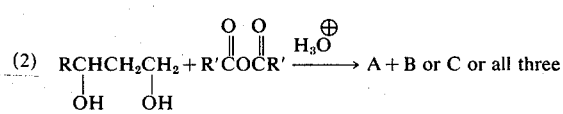

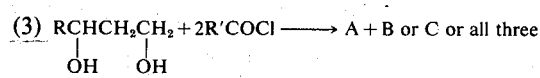

In order to further illustrate the invention, various tests were carried out, the results of which are described in the following examples and tables of data. In Table III are summarized the results of toxicity measurements and nutritional evaluations. These studies were conducted with rats.

It is apparent from the above data that the positioning of the hydroxyl groups has a very significant effect on the toxicity of these compounds and on their ability to be metabolized. Having hydroxyl groups on the first and third carbon atoms of the chain is sufficient to reduce the toxicity and render the compounds metabolizable.

$LD_{50}$ values are a common measure of the toxicity of a compound. These $LD_{50}$ values represent the lethal dose for a 50 percent kill of the animals tested per unit weight of the animals. The higher the $LD_{50}$ value, the lower the toxicity. The data in Table III establish that the 1,3-configurations of polyalcohols are the least toxic. The $LD_{50}$ values are significantly higher in compounds possessing this structural feature. The $LD_{50}$ values given in Table III were obtained by giving test animals graded single doses of the test compounds orally and observing them for one week. The number of deaths in each group was noted and the dose required for a 50 percent kill taken as the $LD_{50}$ value. In many cases, no death occurred even at the 20 g/kg level (about as much as one can give a rat in one dose), hence the basis of the ">20" values shown in the table.

The toxicity data with respect to the esters are given in the following Table IV. The $LD_{50}$ values for some common food preservatives are also shown. All are significantly more toxic (lower $LD_{50}$ values) than either the diols or the esters.

TABLE IV

TOXICITY DATA

| Preservative | Oral $LD_{50}$ (Rats)[1] |
|---|---|
| Diol Esters (propionates and higher) | >20 g/Kg |
| Sorbic acid[2] | 10 g/Kg |
| Sodium sorbate[2] | 6–7 g/Kg |
| Propionic acid[3] | 4 g/Kg |
| Sodium benzoate[2] | 2–3 g/Kg |

[1]$LD_{50}$ = lethal dose for 50% kill.
[2]Source: Handbook of Toxicology, Vol. I., W.S. Spector, ed., WADC Tech. Rept. 55-16, National Academy of Sciences, National Research Council, (1955).
[3]Source: H.F. Smyth et al., Am. Ind. Hyg. Assoc. J., 23, 95 (1962).

The diols and their esters may be incorporated into meats and dairy products in any way in accordance with law. The compounds may be added directly as a spray or incorporated in a dip bath or as a coating on wrapping material. For example, the diol or diol ester may be added to sausage stuffing at about 0.05 to 0.2 percent of the dry weight before stuffing, or the stuffed sausage may be treated with an aqueous solution or suspension of the preservative after stuffing and before drying. Alternately, the casings may be dipped into solutions of the preservatives before stuffing. The diols and esters are highly useful in preserving smoked fish. They may be applied to the fish whole or filleted by spraying or dipping before smoking.

These compounds are readily applied to various dairy products, eggs and to food made from dairy products and eggs. For example, immersion of cheeses in an aqueous solution or fine suspension of a diol or ester provides excellent mold protection to the product. The preservatives may be incorporated into margarine at levels of 0.05 to 0.1 percent of the final product by inclusion in the milk. Impregnating the wrappers of margarine or butter also affords good protection. With pasteurized process cheeses, the diols and esters may be added directly to the cooker.

The diols and their esters are easily incorporated into prepared foods containing meats, eggs or dairy products. Two typical formulations are:

1. Custard Pies

| Ingredients | |
|---|---|
| Flour | 84.0 g |
| Shortening (highly emulsified) | 163.0 g |
| Sucrose | 204.0 g |
| Nutmeg | 1.0 g |
| Vanilla | 2.0 g |
| Dextrose | 5.6 g |
| 1,3 Diol or Diol Ester | 0.23–0.92 g |

Custard pies are made in four stages as follows:

First, the flour, shortening, salt, spice, preservatives and 50 percent of the sugar are creamed together until a specific gravity of 0.9 is reached.

Second, whole egg with the remaining sugar is blended at low speed with the first portion until it resembles cake batter.

Third, the remaining ingredients are blended until the corn syrup is dispersed.

Fourth, the two portions are blended to eliminate lumps but still retain the buoyancy of the batter.

After being placed in an oven, pastry shells are filled with about 635 grams of filling and baked for 37 minutes at 193°C. The pies are then cooled to room temperature.

2. Cheese Cake

| Ingredients | |
|---|---|
| Cottage cheese | 2.27 kg |
| Cake flour | 227 g |
| Corn starch | 113.5 g |
| Salt | 28.3 g |
| One lemon | |
| Whole eggs | 227 g |
| Milk | 908 g |
| Shortening | 113.5 g |
| Sugar | 1.6 kg |
| Water | 454 g |
| Egg whites | 908 g |
| 1,3-Diol or Diol Ester | 0.78–1.5 g |

The cottage cheese, cake flour, corn starch, salt and juice and rind of one lemon plus the preservative are creamed together. Whole eggs are added to the mixture. The sugar is boiled with the water and added to the egg whites. Milk is boiled and mixed with the cheese mixture. The two portions are then combined and placed in the oven as soon as possible and baked at 375°F.

In order to further illustrate the invention, a number of tests were carried out and are listed in the following tables. The results given in Tables V and VI are from basic screening tests under conditions conducive to good growth of the organisms. These tests were carried out as follows:

Nutrient broth was used as the basal nutrient medium for the growth of all microorganisms tested. Five ml of nutrient broth medium (Difco Co.) were placed in 18 mm × 150 mm test tubes and the basal medium sterilized with steam at 15 psi for 15 minutes. After cooling, a sufficient amount of the various compounds were added to the basal medium to give the concentrations used. Normally a final concentration of 0.2, 1, and 2 percent were used.

After mixing the chemicals with nutrient broth, the tubes were inoculated with the various test microorganisms. The test microorganisms were grown 24 hours earlier in nutrient broth and 1 drop of the dense microbial suspension was added to the tubes.

The tubes containing the chemicals and microorganisms were then incubated at the optimal growth temperature reported for each microorganism tested. Either 37°C. or 30°C. was used. Growth in control tubes, as well as those containing chemicals, was observed visually. After a suitable incubation period, a small aliquot of the test solutions was streaked on an agar plate. This was done in order to confirm the visual readings of the presence of microbial growth.

The results are shown in Tables V and VI. The "minimum effective concentration" is the lowest concentration of additive which effectively prevented growth under the conditions of the test.

TABLE V

PRESERVATIVE ACTION AGAINST BACTERIA
Minimum Effective Concentration Against

| Compound | Staph. aureus | Salmonella typhimurium | E. coli |
|---|---|---|---|
| 1,3-Heptanediol | 2% | 1% | 1% |
| 1,3-Octanediol-monopropionate | + | 0.2% | 2% |
| 1,3-Butanediol-dipropionate | + | 0.2% | 1% |
| K-sorbate | + | 2% | + |
| Ca-propionate | + | + | + |

Symbols: + = no effect at 2%.
0 = not tested.

It is apparent from the above that the effectiveness of these materials against a wide spectrum of bacteria is established by the typical data shown in Table V. In these tests the test compounds are compared to the known commercial preservatives, potassium sorbate and calcium propionate, as to their ability to inhibit growth of various bacteria. It is apparent that several of the compounds are effective at lower concentrations than either of the current additives. Of especial interest is the result that some of the test compounds are active against *Salmonella* at levels as low as 0.2 percent. These tests were carried out under conditions conducive to prolific growth of the organisms. Under conditions of normal food storage, the test compounds would be effective at even lower levels. Potassium sorbate was inhibitory in this test only at 2 percent or above under the test conditions and calcium propionate did not inhibit growth even at the 2 percent level. As mentioned above, salmonellae are important public health organisms frequently found in foods, especially meat, eggs, and dairy products. All members of the genus are considered as human pathogens.

The present additives are also very effective with respect to mold inhibition which is shown in the following Table VI.

commercial mold inhibitors, in effectiveness against various common molds. The lower the "minimum" effective concentration, the more effective the compound. It is apparent that several of the test compounds are significantly better than the currently used preservatives.

In addition to these screening tests, some more definitive studies were conducted to determine the effectiveness of certain diols and esters in inhibiting the growth of selected microorganisms under various culture conditions. These tests were carried out as described above except that the pH was varied by the use of suitable buffering agents and, in some experiments, either dextrose or glycerol were added to demonstrate the effectiveness of the diols and esters in different growth media. Organisms were chosen because they were of especial importance in the spoilage of foodstuffs, in particular meats and/or dairy products.

For purposes of comparison, several commercial food preservatives were tested under the same conditions. The results are shown in Tables VII-X. It is apparent from these data that the diols and esters are significantly more effective than the commercial additives. Of especial importance is the finding (Table VII) that 1,3-heptanediol, 1,3-butanediolmonooctanoate and 1,3-octanediolmonopropionate are effective inhibitors of *Salmonella typhimurium* under conditions wherein the commercial bacteriostats are completely inactive. In addition, as shown in Tables IX and X, 1,3-heptanediol and the esters are highly active inhibitors of molds, typified by *A. niger* (Table IX) and *P. roquefortii* at a pH of 6.8 (nearly neutral) where commercial additives are either only slightly effective or ineffective. This is very important for the preservation of meats and dairy products where the pH of the preparation must be near neutrality.

It is apparent from the results of the nutritional and microbiological studies described above that 1,3-diols

TABLE VI

PRESERVATIVE ACTION AGAINST MOLDS

Minimum Effective Concentration Against

| Compound | Trichoderma 12688* | Botrytis 9435* | P. roquefortii 6988* | Fusarium 10911* | B. fulva | A. niger | A. flavus | Bread Mold |
|---|---|---|---|---|---|---|---|---|
| 1,3-Pentanediol | + | + | 2% | + | + | + | + | 0 |
| 1,3-Heptanediol | 1% | 1% | 0.2% | 1% | 0.2% | 0.2% | 1% | 0 |
| 1,3-Pentanediol-monopropionate | 0 | 0 | 1% | 0 | 0 | 1% | 0 | 0.2% |
| 1,3-Octanediol-monopropionate | 0.2% | 0.2% | 0.2% | 0.2% | 0.2% | 0.2% | 0.2% | 0 |
| 1,3-Butanediol-dipropionate | 0.2% | 0.2% | 0.2% | 1% | 0.2% | 0.2% | 0.2% | 0 |
| 1,3-Butanediol-monooctanoate | 0 | 0 | 0.2% | 0 | 0 | 0.2% | 0 | 0.2% |
| 1,3-Pentanediol-monooctanoate | 0 | 0 | 1% | 0 | 0 | 0.2% | 0 | 0.2% |
| Potassium sorbate | 2% | 0.2% | 0.2% | 2% | 2% | 2% | 2% | 0 |
| Calcium propionate | + | 1% | 0.2% | + | + | + | + | 0 |

Symbols: + = No effect at 2%.
0 = Not tested.
*All microorganism numbers - American Type Culture Collection.

In Table VI some selected diols and esters are compared with potassium sorbate and calcium propionate, and their esters are safe and effective antimicrobial preservatives for meats and dairy products.

TABLE VII

MINIMUM EFFECTIVE CONCENTRATION AGAINST SALMONELLA TYPHIMURIUM UNDER SPECIFIED CONDITIONS

|  | Nutrient Broth | Dextrose Added 5% | 10% | 20% | pH 6.9 5% | Glycerol Added 10% | 20% |
|---|---|---|---|---|---|---|---|
| Potassium Sorbate | XX | >1% <2% | >1% <2% | >0.2% <1.0% | XX | XX | XX |
| Propylene Glycol | XX | XX | XX | XX | XX | XX | XX |
| 1,3-Butanediol | XXX | XXX | XXX | XXX | XXX | XXX | XXX |
| Calcium Propionate | XX | XX | XX | XX | XX | XX | XX |
| 1,3-Heptanediol | >0.5% <1.0% | >0.2% <0.5% | >0.2% <0.5% | >0.2% <0.5% | >0.5% <1.0% | >0.5% <1.0% | >0.2% <0.5% |
| 1,3-Butanediol-monooctanoate | 0.1% | 0.05% | 0.05% | 0.1% | 0.1% | 0.05% | 0.05% |
| 1,3-Octanediol-monopropionate | 0.1% | 0.1% | 0.1% | 0.05% | 0.05% | 0.1% | 0.05% |

XX Not effective at the highest level tested: 2%
XXX Not effective at the highest level tested: 5%

TABLE VIII

MINIMUM EFFECTIVE CONCENTRATION AGAINST PSEUDOMONAS AERUGINOSA UNDER SPECIFIED CONDITIONS

|  | Nutrient Broth | Dextrose Added 5% | 10% | 20% | pH 5.2 5% | Glycerol Added 10% | 20% |
|---|---|---|---|---|---|---|---|
| Potassium Sorbate | XXX | XXX | XXX | XXX | XXX | XXX | (*) |
| Calcium Propionate | >1% <2% | >1% <2% | >1% <2% | >1% <2% | >1% <2% | >1% <2% | (*) |
| 1,3-Heptanediol | >0.1% <0.2% | >0.5% <1% | >0.2% <0.5% | >0.2% <0.5% | >0.2% <0.5% | >0.2% <0.5% | (*) |
| 1,3-Butanediol-monoctanoate | XX | XX | XX | XX | XX | XX | (*) |
| 1,3-Octanediol-monopropionate | XX | XX | XX | XX | XX | XX | (*) |

XX Not effective at the highest level tested: 1.0%
XXX Not effective at the highest level tested: 2.0%
(*) No growth at any level

Table IX

MINIMUM EFFECTIVE CONCENTRATION AGAINST ASPERGILLUS NIGER UNDER SPECIFIED CONDITIONS

|  | Nutrient Broth | Dextrose Added 5% | 10% | 20% | pH 6.8 5% | Glycerol Added 10% | 20% |
|---|---|---|---|---|---|---|---|
| Potassium Sorbate | X | X | X | X | X | X | X |
| Propylene Glycol | X | X | X | X | X | X | X |
| 1,3-Butanediol | XX | XX | XX | XX | XX | XX | XX |
| Calcium Propionate | X | X | X | X | X | X | X |
| 1,3-Heptanediol | 0.1 | >0.5 <1.0 | >0.2 <0.5 | >0.5 <1.0 | >0.2 <0.5 | >0.2 <0.5 | >0.5 <1.0 |
| 1,3-Butanediol-monooctanoate | 0.05 | 0.05 | 0.05 | 0.05 | 0.05 | 0.05 | 0.05 |
| 1,3-Octanediol-monopropionate | 0.05 | 0.05 | 0.05 | 0.05 | >0.05 <0.1 | 0.05 | 0.05 |
| Potassium Sorbate | >1.0 <2.0 | X | X | X | X | X | >0.2 <1.0 |
| Calcium Propionate | X | X | X | X | X | X | X |
| 1,3-Heptanediol | 0.1 | >0.2 <0.5 | >0.2 <0.5 | >0.2 <0.5 | >0.2 <0.5 | >0.2 <0.5 | >0.2 <0.5 |
| 1,3-Butanediol-monooctanoate | 0.1 | 0.1 | 0.1 | 0.1 | 0.1 | 0.1 | 0.1 |
| 1,3-Octanediol-monopropionate | 0.1 | 0.1 | 0.1 | 0.1 | 0.1 | 0.1 | 0.1 |

X Not effective at the highest level tested: 2%
XX Not effective at the highest level tested: 5%

TABLE X

MINIMUM EFFECTIVE CONCENTRATION AGAINST PENICILLIUM ROQUEFORTII UNDER SPECIFIED CONDITIONS

|  | Nutrient Broth | Dextrose Added 5% | 10% | 20% | pH 6.8 5% | Glycerol Added 10% | 20% |
|---|---|---|---|---|---|---|---|
| Potassium Sorbate | >0.2% <1.0% | >0.2% <1.0% | >0.2% <1.0% | >0.2% <1.0% | >0.2% <1.0% | >0.2% <1.0% | >0.2% <1.0% |
| Calcium Propionate | XX | XX | XX | XX | XX | XX | XX |

Table X—Continued

MINIMUM EFFECTIVE CONCENTRATION AGAINST
PENICILLIUM ROQUEFORTII
UNDER SPECIFIED CONDITIONS

|  | Nutrient Broth | pH 6.8 Dextrose Added | | | Glycerol Added | | |
|---|---|---|---|---|---|---|---|
|  |  | 5% | 10% | 20% | 5% | 10% | 20% |
| 1,3-Heptanediol | 0.05% | >0.2% <0.5% | >0.2% <0.5% | >0.2% <0.5% | >0.2% <0.5% | >0.2% <0.5% | >0.2% <0.5% |
| 1,3-Butanediol-monooctanoate | 0.05% | 0.05% | 0.05% | 0.05% | 0.05% | 0.05% | 0.05% |
| 1,3-Octanediol-monopropionate | 0.05% | 0.05% | 0.05% | 0.05% | 0.05% | 0.05% | 0.05% |
| Potassium Sorbate | >0.2% <1.0% | >0.2% <1.0% | >0.2% <1.0% | >0.2% <1.0% | >0.2% <1.0% | >0.2% <1.0% | >0.2% <1.0% |
| Calcium Propionate | XX | XX | XX | XX | XX | XX | XX |
| 1,3-Heptanediol | 0.1% | >0.2% <0.5% | >0.2% <0.5% | >0.2% <0.5% | >0.2% <0.5% | >0.2% <0.5% | >0.2% <0.5% |
| 1,3-Butanediol-monooctanoate | 0.1% | 0.1% | 0.1% | 0.1% | 0.1% | 0.1% | 0.1% |
| 1,3-Octanediol-monopropionate | 0.1% | 0.1% | 0.1% | 0.1% | 0.1% | 0.1% | 0.1% |

XX Not effective at the highest level tested: 2%

What is claimed is:

1. A method for preserving meat and cheese products in a bacteria and mold-free state comprising incorporating in such products from 0.05 to 5.0 wt. percent of a preservative selected from the group consisting of normal aliphatic 1,3-diols having three to 15 carbon atoms, mono and diesters of said aliphatic 1,3-diols, said esters having two to 20 carbon atoms in the acyl portion of the molecule, whereby said products are preserved in a bacteria and mold-free state.

2. The method of claim 1 wherein said preservative is an aliphatic 1,3-diol having three to 10 carbon atoms in the molecule.

3. The method of claim 1 wherein said preservative is 1,3-heptane diol.

4. The method of claim 2 wherein from about 0.1 to 3.0 weight percent of said preservative is incorporated in said product.

5. The method according to claim 1 wherein from about 0.1 to 2.0 weight percent of the preservative is incorporated in said product and the preservative is a monoester of 1,3-diol.

6. The method according to to claim 5 wherein said monoester contains four to six carbon atoms in the diol portion of the molecule and from six to 10 carbon atoms in the acyl portion of the molecule.

7. The method of claim 5 wherein said monoester is 1,3-butane diol-1-monooctanoate.

8. The method of claim 5 wherein said monoester contains from seven to 10 carbon atoms in the diol portion of the molecule and from two to five carbon atoms in the acyl portion of the molecule.

9. The method according to claim 8 wherein said monoester is 1,3-octane diol-1-monopropionate.

10. The method according to claim 1 wherein said preservative is a diester containing from four to 10 carbon atoms in the diol portion of the molecule and from two to 20 carbon atoms in the acyl portion of the molecule.

11. The method according to claim 10 wherein said diester is 1,3-butanediol dipropionate.

* * * * *